(12) United States Patent
Sharma et al.

(10) Patent No.: US 12,039,900 B1
(45) Date of Patent: Jul. 16, 2024

(54) HYBRID HEAD-UP DISPLAY CALIBRATION

(71) Applicant: GM Global Technology Operations LLC, Detroit, MI (US)

(72) Inventors: Manoj Kumar Sharma, Troy, MI (US); Joseph F. Szczerba, Grand Blanc, MI (US); Thomas A. Seder, Fraser, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/354,986

(22) Filed: Jul. 19, 2023

(51) Int. Cl.
*G09G 3/00* (2006.01)
*G02B 27/00* (2006.01)
*G02B 27/18* (2006.01)
*G06T 3/18* (2024.01)
*G06V 40/19* (2022.01)

(52) U.S. Cl.
CPC ......... *G09G 3/001* (2013.01); *G02B 27/0012* (2013.01); *G02B 27/18* (2013.01); *G06T 3/18* (2024.01); *G06V 40/19* (2022.01); *G09G 2320/0693* (2013.01); *G09G 2360/02* (2013.01); *G09G 2380/10* (2013.01)

(58) Field of Classification Search
CPC ........... G09G 3/001; G09G 2320/0693; G09G 2360/02; G09G 2380/10; G06V 40/19; G06T 3/18; G02B 27/0012; G02B 27/18
See application file for complete search history.

(56) References Cited

U.S. PATENT DOCUMENTS

| | | | | |
|---|---|---|---|---|
| 10,996,470 | B2 * | 5/2021 | Chang | B60K 35/425 |
| 11,858,349 | B1 * | 1/2024 | Kennerly | B60K 35/00 |
| 2020/0082570 | A1 * | 3/2020 | Wunderwald | G02B 27/0179 |
| 2022/0365357 | A1 * | 11/2022 | Kuznetsov | B60K 35/00 |
| 2024/0029599 | A1 * | 1/2024 | Chang | G09G 3/002 |
| 2024/0046619 | A1 | 2/2024 | Sharma et al. | |

FOREIGN PATENT DOCUMENTS

DE 102017001015 A1 11/2017
DE 102018001969 A1 9/2018

* cited by examiner

*Primary Examiner* — Doon Y Chow
(74) *Attorney, Agent, or Firm* — Vivacqua Crane, PLLC

(57) ABSTRACT

A method of calibrating a head-up display system includes training a neural network to predict warp maps for an occupant perspective of a single graphical image projected onto a windshield of the vehicle, projecting, with a digital light projector, a graphical image onto the windshield, capturing, with a camera in proximity to the digital light projector, the graphical image projected onto the windshield, locating, with an occupant monitoring system, an occupant eye ellipse position, predicting, with the neural network, a warp map for an occupant perspective of the projected graphical image based on the location of the digital light projector, the occupant eye ellipse position and a shape of the windshield, applying, with the controller, the warp map to the graphical image projected by the digital light projector, and projecting, with the digital light projector, a corrected graphical image based on the predicted warp map.

20 Claims, 5 Drawing Sheets

HYBRID HEAD-UP DISPLAY CALIBRATION

INTRODUCTION

The present disclosure relates to systems and methods for displaying graphics in a vehicle, and more particularly, to graphics projectors for use in a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a surface (e.g., a windscreen) of the vehicle. Full windshield displays with embedded transparent phosphors require calibration to correct errors due to keystone, windshield shape variations and installation errors.

Thus, while current systems achieve their intended purpose, there is a need for a new and improved system and method to correct an image displayed to compensate for image distortion by calculating warping maps and then encoding the distortion information into a two-dimensional image projected onto the windshield.

SUMMARY

According to several aspects of the present disclosure, a method of calibrating a head-up display system within a vehicle includes training a neural network in communication with a controller to predict warp maps for an occupant perspective of a single graphical image projected onto an inner surface of a windshield of the vehicle, projecting, with a digital light projector positioned within the vehicle, a graphical image onto an inner surface of the windshield of the vehicle, capturing, with a camera in proximity to the digital light projector, the graphical image projected onto the inner surface of the windshield, locating, with an occupant monitoring system within the vehicle, an occupant eye ellipse position, predicting, with the neural network, a warp map for an occupant perspective of the projected graphical image based on the location of the digital light projector, the occupant eye ellipse position and a shape of the windshield within the vehicle, applying, with the controller, the warp map to the graphical image projected by the digital light projector, and projecting, with the digital light projector, a corrected graphical image based on the predicted warp map.

According to another aspect, the training a neural network within a controller to predict warp maps for an occupant perspective of a single graphical image projected onto an inner surface of a windshield of the vehicle further includes projecting, with a reference digital light projector of a reference system, a source image onto an inner surface of a reference windshield, capturing, with a first reference camera located at a reference occupant eye ellipse position, the source image from a perspective of the reference occupant eye ellipse position, capturing, with a second reference camera located in proximity to the reference digital light projector, the source image from a perspective of the reference digital light projector, calculating, with a reference controller, a transformation matrix between the captured source image from the perspective of the reference occupant eye ellipse position and the captured image from the perspective of the reference digital light projector, and creating a reference warp map for the captured source image.

According to another aspect, the training a neural network within a controller to predict warp maps for an occupant perspective of a single graphical image projected onto an inner surface of a windshield of the vehicle further includes creating a plurality of reference warp maps for a plurality of different source images, each of the plurality of different source images being projected at a plurality of different locations on the inner surface of the reference windshield and from a plurality of different reference digital light projector locations within the reference system, and storing the plurality of reference warp maps within the neural network.

According to another aspect, the training a neural network within a controller to predict warp maps for an occupant perspective of a single graphical image projected onto an inner surface of a windshield of the vehicle further includes creating the plurality of reference warp maps for a plurality of different reference windshields, and storing the plurality of reference warp maps within the neural network.

According to another aspect, the predicting, with the neural network, a warp map for an occupant perspective of the projected graphical image based on the occupant eye ellipse position further includes applying, with the neural network, interpolation algorithms to predict the warp map for the projected graphical image based on the location of the digital light projector, the occupant eye ellipse position and a shape of the windshield within the vehicle.

According to another aspect, the applying, with the controller, the warp map to the graphical image projected by the digital light projector further includes encoding, with the controller, distortion information from the warp map into the graphical image projected by the digital light projector.

According to another aspect, the method further includes initiating calibration of the head-up display within the vehicle upon selective actuation by an occupant within the vehicle.

According to another aspect, the method further includes initiating calibration of the head-up display within the vehicle automatically.

According to another aspect, the projecting, with a digital light projector, a graphical image onto the inner surface of the windshield of the vehicle further includes projecting, with a light source, an excitation light, focusing, with a condensing lens, the excitation light from the light source, splitting, with a color filter, the focused excitation light into red, green and blue light, focusing, with a shaping lens, the excitation light passing through the color filter, re-directing, with a digital micro-mirror device (DMD), the excitation light, and receiving, with a projection lens, the excitation light from the digital micro-mirror device and projecting, with the projection lens, the excitation light to the inner surface of the windshield.

According to another aspect, the projecting, with the digital light projector positioned within the vehicle, the graphical image onto the inner surface of the windshield of the vehicle further includes projecting, with the digital light projector, an excitation light, wherein light emitting particles within the windshield emit visible light in response to absorbing the excitation light.

According to several aspects of the present disclosure, a head-up display system within a vehicle includes a controller adapted to calibrate the head-up display, a neural network, in communication with the controller, adapted to predict warp maps for an occupant perspective of a single graphical image projected onto an inner surface of a windshield of the vehicle, a digital light projector positioned within the vehicle and adapted to project a graphical image onto an inner surface of the windshield of the vehicle, a camera in proximity to the digital light projector and adapted to capture the graphical image projected onto the inner surface of the windshield, an occupant monitoring system within the vehicle adapted to locate an occupant eye ellipse position, the neural network further adapted to predict a warp map for an occupant perspective of the projected graphical image based on the location of the digital light projector, the occupant eye ellipse position and a shape of the windshield within the vehicle, the controller further adapted to apply the warp map to the graphical image projected by the digital light projector, and the digital light projector further adapted to project a corrected graphical image based on the predicted warp map.

According to another aspect, the system further includes a reference system including a reference digital light projector adapted to project a source image onto an inner surface of a reference windshield, a first reference camera located at a reference occupant eye ellipse position and adapted to capture the source image from a perspective of the reference occupant eye ellipse position, a second reference camera located in proximity to the reference digital light projector and adapted to capture the source image from a perspective of the reference digital light projector, and a reference controller adapted to calculate a transformation matrix between the captured source image from the perspective of the reference occupant eye ellipse position and the captured image from the perspective of the reference digital light projector and create a reference warp map for the captured source image.

According to another aspect, the reference controller is further adapted to create a plurality of reference warp maps for a plurality of different source images, each of the plurality of different source images being projected at a plurality of different locations on the inner surface of the reference windshield and from a plurality of different reference digital light projector locations within the reference system and store the plurality of reference warp maps within the neural network.

According to another aspect, the reference controller is further adapted to create the plurality of reference warp maps for a plurality of different reference windshields and store the plurality of reference warp maps within the neural network.

According to another aspect, when predicting a warp map for an occupant perspective of the projected graphical image based on the occupant eye ellipse position, the neural network is further adapted to apply interpolation algorithms to predict the warp map for an occupant perspective of the projected graphical image based on the location of the digital light projector, the occupant eye ellipse position and a shape of the windshield within the vehicle.

According to another aspect, when applying the warp map to the graphical image projected by the digital light projector, the controller is further adapted to encode distortion information from the warp map into the graphical image projected by the digital light projector.

According to another aspect, the controller is further adapted to initiate calibration of the head-up display within the vehicle one of upon selective actuation by an occupant within the vehicle, and automatically.

According to another aspect, the digital light projector includes a light source adapted to project an excitation light, a condensing lens adapted to focus the excitation light from the light source, a color filter adapted to split the focused excitation light into red, green and blue light, a shaping lens adapted to focus the excitation light passing through the color filter, a digital micro-mirror device (DMD) adapted to re-direct the excitation light, and a projection lens adapted to receive the excitation light from the digital micro-mirror device and project the excitation light to the inner surface of the windshield.

According to another aspect, the digital light projector is adapted to project an excitation light, wherein light emitting particles within the windshield emit visible light in response to absorbing the excitation light.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
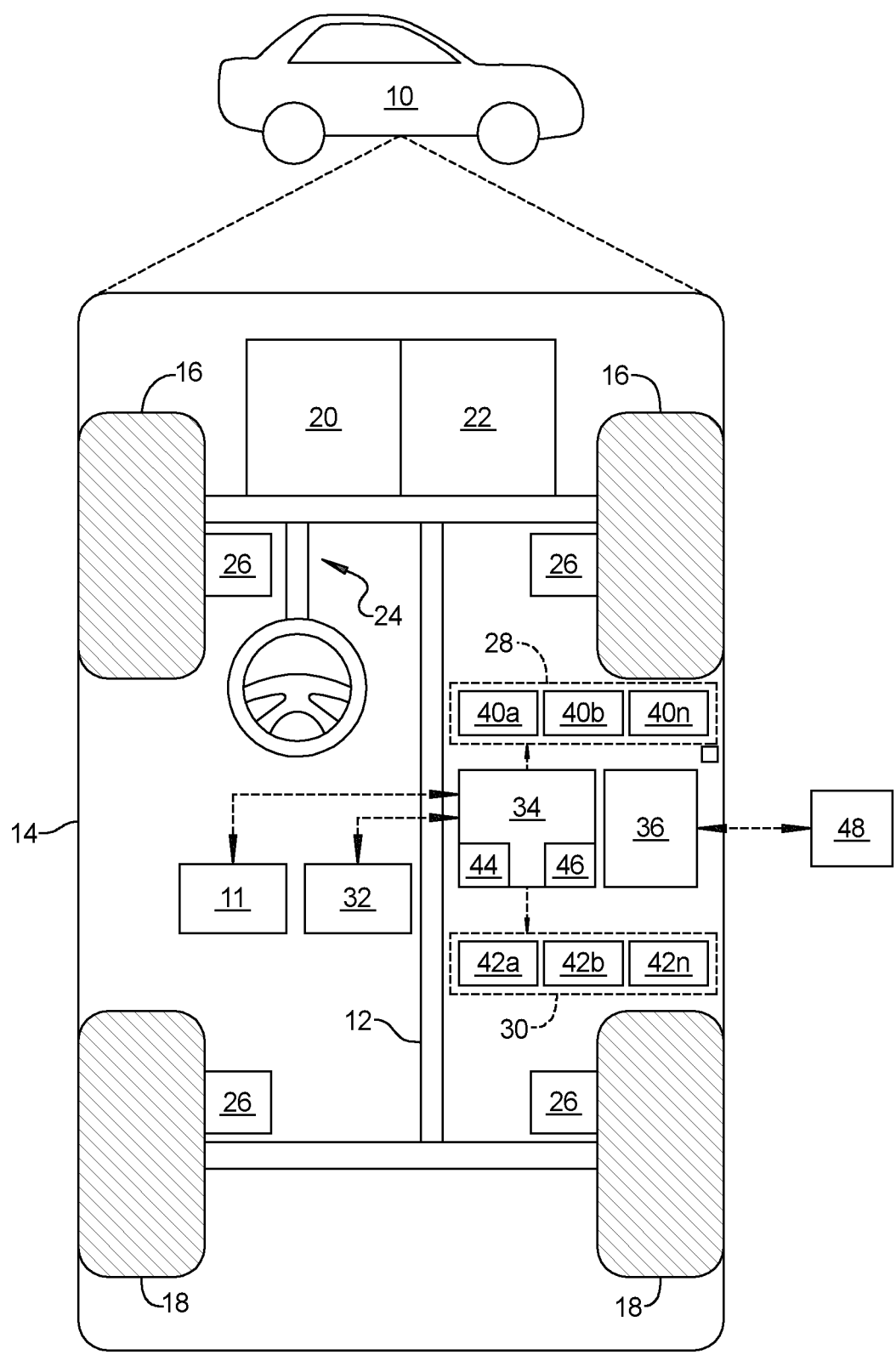
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated hybrid head-up display system 11 within the vehicle 10 in accordance with various embodiments. In general, the hybrid head-up display system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
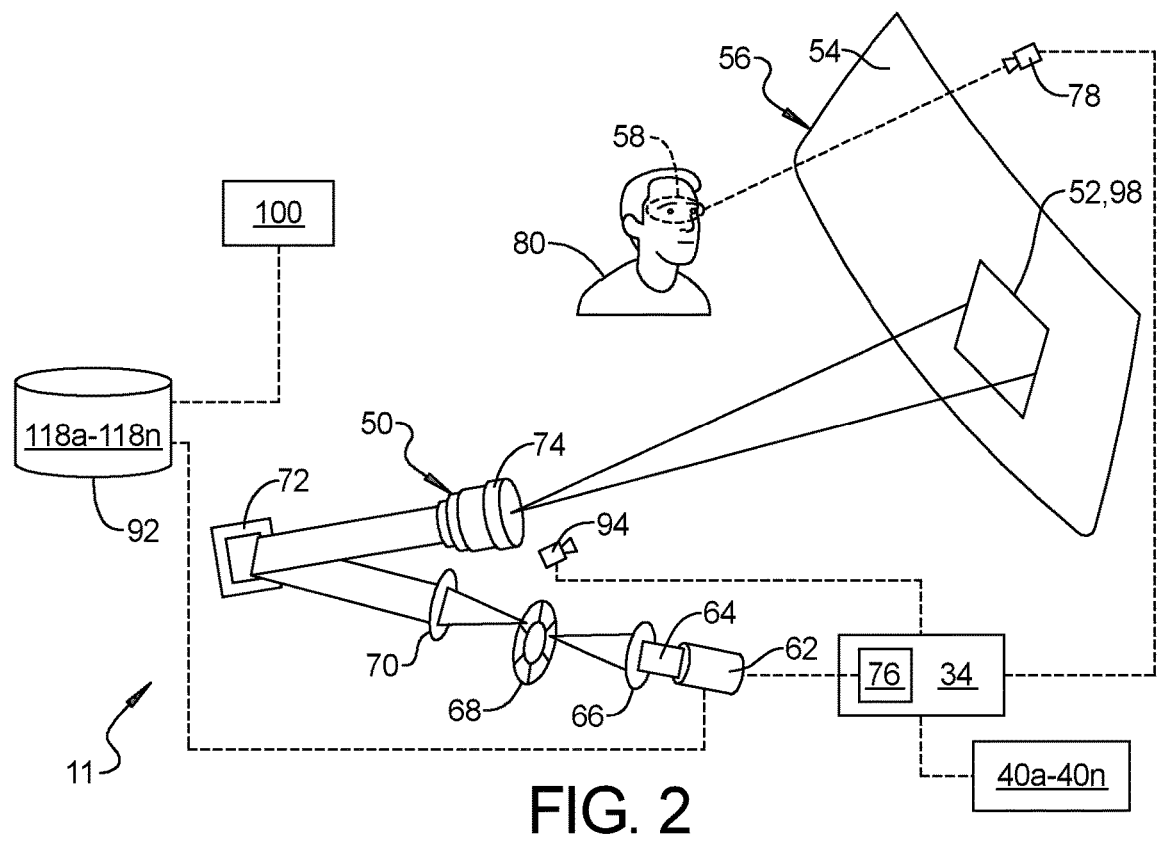
FIG. 2 is a schematic diagram of a system according to an exemplary embodiment of the present disclosure.

Referring to FIG. 2, a head-up display system 11 in accordance with an exemplary embodiment is in communication with the vehicle controller 34, and the vehicle controller 34 is adapted to calibrate the head-up display system 11. A digital light projector (DLP) 50 is positioned within the vehicle 10 and adapted to project a graphical image 52 onto an inner surface 54 of the windshield 56 of the vehicle 10.

The DLP 50 projects a graphical image 52 that contains various information/infotainment applications. The DLP 50 is capable of projecting two-dimensional and three-dimensional images that depict objects such as pedestrians, buildings and other vehicles in the environment surrounding the vehicle 10. In an exemplary embodiment, the DLP 50 includes a light source 62 adapted to project an excitation light 64, a condensing lens 66 adapted to focus the excitation light 64 from the light source 62, a color filter 68 (color wheel) adapted to split the focused excitation light 64 into red, green and blue light, a shaping lens 70 adapted to focus the excitation light 64 passing through the color filter 68, a digital micro-mirror device (DMD) 72 adapted to re-direct the excitation light 64, and a projection lens 74 adapted to receive the excitation light 64 from the digital micro-mirror device (DMD) 72 and project the excitation light 64 to the inner surface 54 of the windshield 56.

The vehicle controller 34 includes a DLP engine 76. The DLP engine 76 includes a programmable processor including programming to monitor various inputs and determine what information is appropriate to display. The DLP engine 76 can communicate directly with various systems and components, or the DLP engine 76 can alternatively or additionally communicate over a LAN/CAN system. The DLP engine 76 utilizes information regarding the operational environment of the vehicle 10 derived from a number of inputs. The various sensing devices 40a-40n collect and provide information. The sensing devices 40a-40n include a camera or image capturing device taking periodic or sequential images representing a view from the vehicle 10. The windshield 56 is equipped with features capable of displaying an image projected thereupon while remaining transparent or substantially transparent such that occupants of the vehicle 10 can clearly observe outside of the vehicle 10 through the windshield 56. It should be understood that, as depicted, the windshield 56 is in the front of the vehicle 10, other surfaces within the vehicle 10 could be used for projection, including side windows and a rear window. Additionally, the view on the front windshield 56 could be continued upon the front vehicle "A-pillars" and onto the side windows as a continuous image.

The DLP engine 76 includes display software or programming translating requests to display information from the DLP engine 76 in graphical representations describing the information. The DLP engine 76 includes programming to compensate for the curved and tilted surface of the windshield 56 and any other surfaces onto which the first graphical image 52 is to be projected. The DLP engine 76 controls the light source 62 which includes a laser or projector device producing an excitation light 64 to project the graphical image 52.

An occupant monitoring system 78 includes sensors known in the art to approximate a location of the head of an occupant and further the orientation or gaze location of the eyes of the occupant. Based upon the output of the occupant monitoring system 78 and input data tracking location information regarding the environment around the vehicle 10, the DLP engine 76 can accurately position the graphical image 52 such that the occupant 80 sees the graphical image 52 overlaid with visual images through the windshield 56. an eye tracking system within the vehicle adapted to locate an occupant eye ellipse position The system 11 described above includes eye sensing and head sensing devices allowing estimation of eye location, allowing registration of images upon the windshield 56 such that the images correspond to a view of the operator 80. Further, the occupant monitoring system 78 allows the system 11 to locate an occupant eye ellipse 58 position. An eye ellipse 58 is a three-dimensional graphical depiction of a multivariate normal distribution used to approximate the distribution of an occupant's 80 eye locations within the vehicle 10. The eye ellipse 58 is represented by two three-dimensional ellipses, one for the right eye and one for the left eye.

It will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle 10 can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the windshield 56 and the position of an occupant eye ellipse 58 position are contemplated, and the disclosure is not intended to be limited to the particular embodiments described herein.

Figure 3:
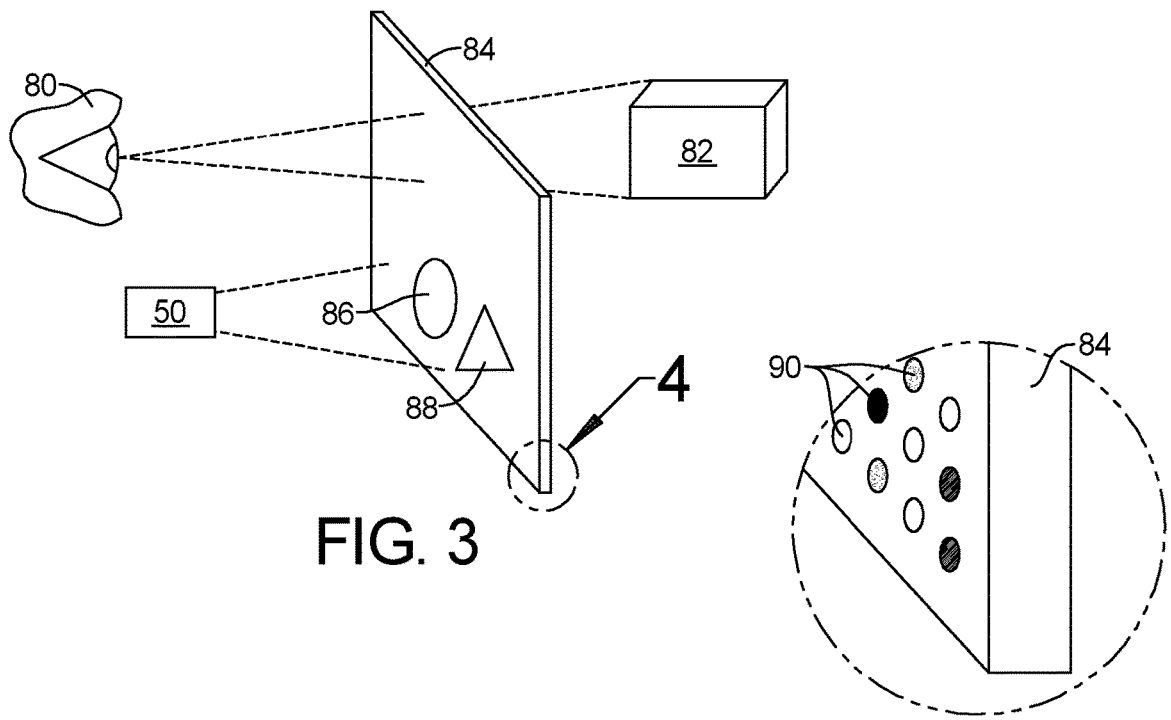
FIG. 3 is schematic illustration of a substrate for the windshield of the vehicle according to an exemplary embodiment.
Figure 4:
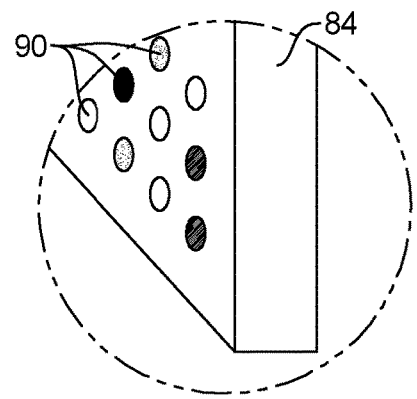
FIG. 4 is a enlarged portion of FIG. 4, as indicated by the circle labelled "FIG. 4" in FIG. 3.

The windshield 56 functions as a medium through which relevant features are observable while serving as a display device upon which the first graphical image 52 may be displayed. The windshield 56 is both transparent and capable of displaying images projected by an excitation light 64. Referring to FIG. 3 and FIG. 4, an occupant 80 is able to see an arbitrary object (e.g. cube 82) through a substrate 84 positioned on the windshield 56.

The substrate 84 may be transparent or substantially transparent. While the occupant 80 sees the arbitrary object 82 through the substrate 84, the occupant 80 can also see images (e.g. circle 86 and triangle 88) that are created at the substrate 84. The substrate 84 may be part of the windshield 56, a glass substrate, a plastic substrate, a polymer substrate, or other transparent (or substantially transparent) medium that would be appreciated by one of ordinary skill in the art. Other substrates may complement the substrate 84 to provide for tinting, substrate protection, light filtering (e.g. filtering external ultraviolet light), and other functions.

FIG. 4 depicts illumination of transparent displays illuminated with excitation light 64 (e.g. ultraviolet light) from a light source 62. The substrate 84 receives excitation light 64 from the light source 62. The received excitation light 64 may be absorbed by light emitting material 90 at the substrate 84. When the light emitting material receives the excitation light 64, the light emitting material 90 emits visible light. Accordingly, images (e.g. circle 86 and triangle 88) may be created at the substrate 84 by selectively illuminating the substrate 84 with excitation light 64.

In an exemplary embodiment, the light emitting material 90 includes transparent phosphors that are embedded into the substrate 84. The transparent phosphors are light emitting particles which fluoresce in response to being excited by the excitation light 64. In an exemplary embodiment, the transparent phosphors are red, green, and blue (RGB) phosphors, allowing full color. The use of monochrome and/or two-color phosphors is also within the scope of the present disclosure. When excitation light 64 is absorbed by the transparent phosphors, visible light is emitted by the transparent phosphors. The excitation light 64 is provided by the light source 62. Use of the substrate 84 and light emitting material 90 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 64 may be ultraviolet light, in accordance with embodiments of the present disclosure. If the excitation light 64 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 90 absorbs the ultraviolet light and emits lower energy visible light, the ultraviolet light is down-converted to visible light because the ultraviolet light's energy level goes down when it is converted into visible light.

It should be understood, the excitation wavelengths described herein are used particularly for a given sheet of phosphors. Other technology could also be used, such as a holographic grating (Bragg gratings) based technology which uses visible light projectors, wherein RGB LEDs are used to make a vector graphics projector and an RGB-DLP projector.

As shown in FIG. 2, the excitation light 64 is output by the light source 62 of the DLP 50. In an exemplary embodiment, the light source 62 is a micro-mirror array (MMA) projector (e.g. a digital light processing (DLP) projector 50). In the DLP 50, the first graphical image 52 is created by microscopically small mirrors laid out in a matrix on a semiconductor chip within the DMD 72. An MMA projector that outputs ultraviolet light may be similar to a MMA projector that outputs visible light, except that the color filter 68 has light filters that are tailored to the ultraviolet light spectrum. In other embodiments, the DLP 50 is a liquid crystal display (LCD) projector. In embodiments, the DLP 50 may be a liquid crystal on silicon (LCOS) projector. In embodiments, the DLP 50 may be an analog projector (e.g. a slide film projector or a movie film projector). One of ordinary skill in the art would appreciate other types of projectors which may be used to project ultraviolet light on the substrate 84.

Referring again to FIG. 2, the system 11 further includes a neural network 92, in communication with the controller 34. The neural network 92 is adapted to predict warp maps for the vehicle occupant perspective from a single graphical image taken by a camera 94 that is positioned in proximity (embedded within) the digital light projector 50, as will be discussed in detail below.

The camera 94 is positioned within the vehicle 10 in proximity to the digital light projector 50 and is adapted to capture the graphical image 52 projected onto the inner surface 54 of the windshield 56 from the perspective of the digital light projector 50. The camera 94 may be integrated within the digital light projector 50. The neural network 92 is further adapted to predict a warp map 96 for the driver/occupant perspective of the projected graphical image 52 based on the location of the digital light projector 50, the occupant eye ellipse 58 position and a shape of the windshield 56 within the vehicle 10. The controller 34 is further adapted to apply the predicted warp map 96 to the graphical image 52 projected by the digital light projector 50, and the digital light projector 50 is further adapted to project a corrected graphical image 98 based on the predicted warp map 96.

Figure 5:
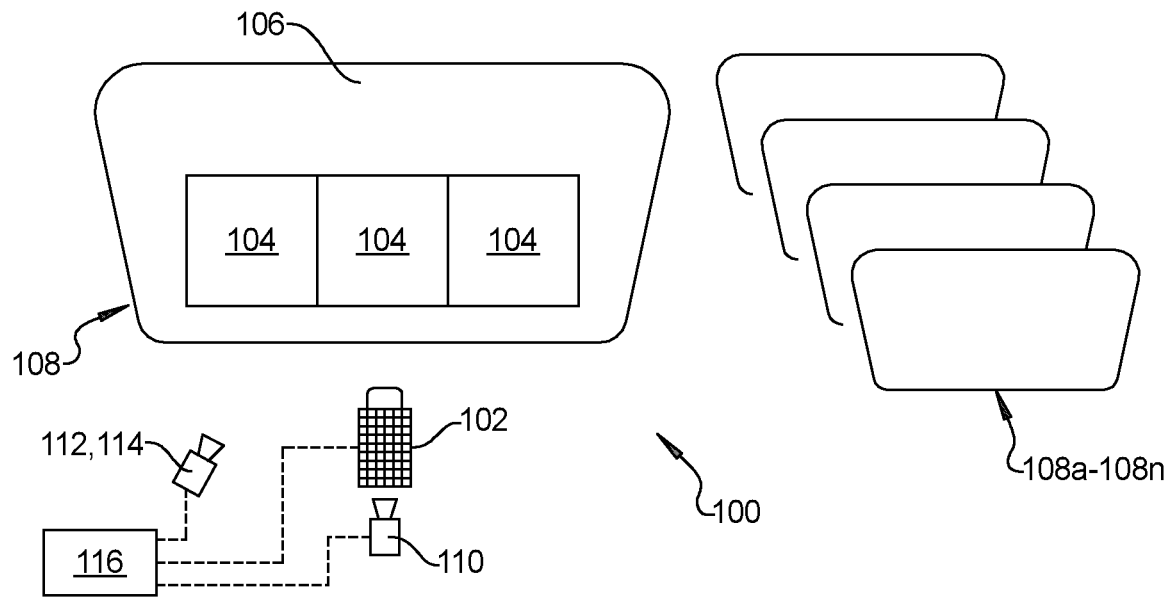
FIG. 5 is a schematic diagram of a reference system in accordance with an exemplary embodiment of the present disclosure.

Referring to FIG. 2 and FIG. 5, in an exemplary embodiment, the system 11 includes a reference system 100. The reference system 100 includes a reference digital light projector 102 adapted to project a source image 104 onto an inner surface 106 of a reference windshield 108. A first reference camera 110 is located at a reference occupant eye ellipse position 112 and adapted to capture the source image 104 from a perspective of the reference occupant eye ellipse position 112. A second reference camera 114 is positioned within the vehicle 10 in proximity to the reference digital light projector 102 and is adapted to capture the source image 104 from a perspective of the reference digital light projector 102. A reference controller 116 is adapted to calculate a transformation matrix between the captured source image 104 from the perspective of the reference occupant eye ellipse 58 position and the captured source image 104 from the perspective of the reference digital light projector 102 and create a reference warp map 118 for the captured source image 104.

Figure 6:
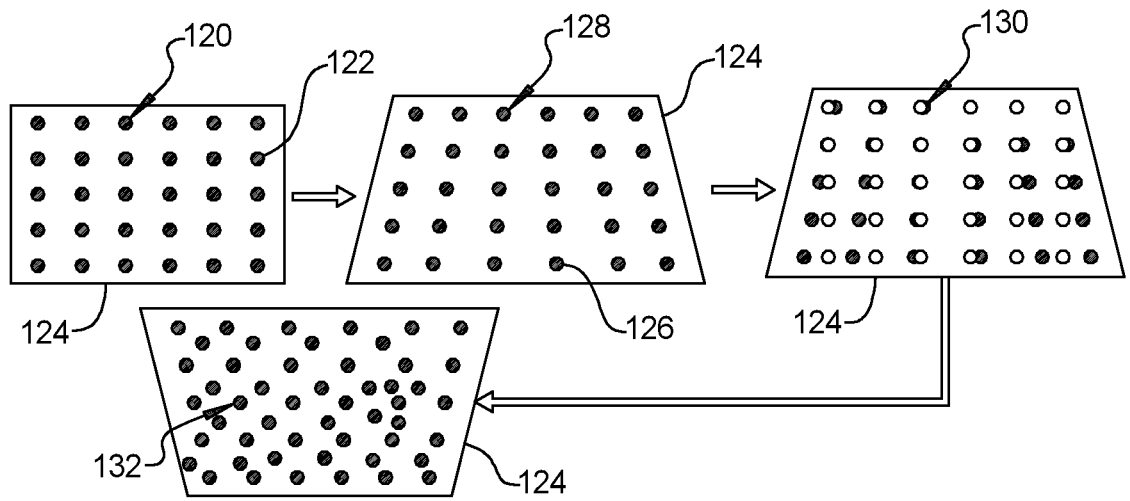
FIG. 6 is a schematic diagram illustrating a projected source image from the perspective of a second reference camera, the projected source image from the perspective of a first reference camera, a warp map and a corrected graphical image.

Referring to FIG. 6, the reference controller 116 uses the reference DLP 102 to project the source image 104 on the reference windshield 108. The reference controller uses the second reference camera 114 capture the source image 104 from a perspective of the reference digital light projector 102, as shown at 120. In the scope of the present disclosure, the source image 104 includes a plurality of projected dots 122 arranged in a uniform two-dimensional array or grid (i.e., a distance between each dot and the surrounding dots is consistent). Each of the plurality of projected dots 122 has an intended x-coordinate and an intended y-coordinate defined relative to a field-of-projection 124. The source image 104 is represented as an intended source image matrix. In the scope of the present disclosure, the intended source image matrix is a two-dimensional matrix having a plurality of elements. Each of the plurality of elements of the intended source image matrix defines a location of one of the plurality of projected dots 122 by storing the intended x-coordinate and the intended y-coordinate of the one of the plurality of projected dots 122. For the exemplary source image 104 shown in FIG. 6, the intended source image matrix is:

$$I = \begin{bmatrix} x_1, y_1 & \cdots & x_9, y_1 \\ \vdots & & \vdots \\ x_1, y_7 & \cdots & x_9, y_7 \end{bmatrix} \quad (1)$$

wherein I is the intended source image matrix, $x_n$ is the intended x-coordinate of one of the plurality of projected dots 122 located in column n of the intended source image matrix, and $y_m$ is the intended y-coordinate of one of the plurality of projected dots 122 located in row m of the intended source image matrix. It should be understood that the source image 104 may have any number of dots and the intended source image matrix may have any number of rows and/or columns without departing from the scope of the present disclosure.

The reference controller 116 uses the first reference camera 110 to capture the source image 104 from the perspective of the reference occupant eye ellipse position 112. Due to manufacturing variation (e.g., curvature variation, glass thickness uniformity variation, glass surface quality variation, glass coating uniformity variation, and/or the like) of the reference windshield 108, and due to the position of the reference occupant eye ellipse position 112 relative to the reference windshield 108, the source image 104 appears distorted, as shown at 126. In other words, as shown at 130, the location of each of the plurality of projected dots 122 of the source image 104 from the perspective of the second reference camera 114, as shown at 120, does not correspond with the location of each of a plurality of projected dots 126 of the source image 104 from the perspective of the first reference camera 110, as shown at 128.

In an exemplary embodiment, the reference controller 116 uses a computer vision algorithm to identify the plurality of projected dots 126 of the source image 104 from the perspective of the first reference camera 110, as shown at 128. In the scope of the present disclosure, identifying the plurality of projected dots 126 means that the reference controller 116 isolates the plurality of projected dots 126 from other elements in the captured image 128 (e.g., background objects, dust particles, camera artifacts, and/or the like) such that a location of each of the plurality of projected dots 126 may be determined, as discussed below. In an exemplary embodiment, the computer vision algorithm is trained by providing the computer vision algorithm with a plurality of sub-images including dots at various positions and angles. After sufficient training of the computer vision algorithm, the reference controller 116 can identify the plurality of projected dots 126 with a high degree of accuracy and precision. After identifying the plurality of projected dots 126 of the source image 104 from the perspective of the first reference camera 110, the reference controller 116 determines an actual x-coordinate and an actual y-coordinate of each of the plurality of projected dots 126 of the source image 104 from the perspective of the first reference camera 110. In an exemplary embodiment, the actual coordinates of each of the plurality of projected dots 126 of the source image 104 from the perspective of the first reference camera 110 are identified by performing pixel measurements to each of the plurality of projected dots 126 of the source image 104 from the perspective of the first reference camera 110 relative to the field-of-projection 124.

The reference controller 116 generates an actual source image matrix. In the scope of the present disclosure, the actual source image matrix contains the actual x-coordinate and the actual y-coordinate of each of the plurality of projected dots 126 of the source image 104 from the perspective of the first reference camera 110. The reference controller 116 then calculates a transformation matrix. In the scope of the present disclosure, the transformation matrix encodes differences between the location of each of the plurality of projected dots 122 of the source image 104 from the perspective of the second reference camera 114, as shown at 120, and the location of each of the plurality of projected dots 126 of the source image 104 from the perspective of the first reference camera 110, as shown at 128, and defines a reference warp map 118. In an exemplary embodiment, to calculate the transformation matrix, the actual source image matrix is subtracted from the intended source image matrix.

The reference warp map 118, when applied to the source image 104 being projected by the reference DLP 102, adjusts the projected source image 104 to compensate for distortion due to manufacturing variation in the glass of the reference windshield 108 and due to the position of the reference occupant eye ellipse position 112 relative to the reference windshield 108, as shown at 132. Using the reference warp map 96 calibrates the reference system 100 such that the location of each of the plurality of projected dots 126 of the source image 104 from the perspective of the first reference camera 110, corresponds with the location of each of the plurality of projected dots 122 of the original source image 104.

The warp map 96 provides a calibration tool for the specific location (position/angle) of the first reference camera, the second reference camera and the reference DLP 102, as well as features of the reference windshield as manufactured and installed within the reference system. The reference controller 116 is further adapted to create a plurality of reference warp maps 118a-118n for a plurality of different source sub-images 104a-104n, each of the plurality of different source sub-images being projected at a plurality of different locations on the inner surface 106 of the reference windshield 108 and from a plurality of different reference digital light projector 102 locations within the reference system 100. Further, the reference controller 116 is adapted to create the plurality of reference warp maps 118a-118n for a plurality of different reference windshields 108a-108n. The plurality of reference warp maps 118a-118n are stored within the neural network 92.

In an exemplary embodiment, when predicting a warp map 96 for the projected graphical image 52 based on the occupant eye ellipse 58 position, the neural network 92 is further adapted to apply interpolation algorithms to predict the warp map 96 for the projected graphical image 52 based on the location of the digital light projector 50, the occupant eye ellipse 58 position and a shape of the windshield 56 within the vehicle 10. The neural network 92 receives information related to the location of the digital light projector 50 based on feedback from the camera 94 and information on the shape of the windshield 56 based on the captured graphic image 52 from the perspective of the camera 94. In the vehicle 10, there is no camera located at the occupant eye ellipse 58 position, so no comparison can be made between the image 52 from the perspective of the camera 94 and the image from a perspective of the occupant eye ellipse 58 position. Thus, the neural network 92 looks at the plurality of reference warp maps 118a-118n stored therein and uses machine learning to predict a warp map 96 for the current circumstances.

The collection of reference warp maps 118a-118n within the neural network 92 includes collected object space images and corrected object space images for various first reference camera positions (position and angle of the first reference camera 110 in proximity to the reference DLP 102, and thus, position and angle of the reference DLP 102), source image 104 sizes and windshield regions. The neural network 92 predicts a warp map 96 to correct images from the perspective of the occupant eye ellipse 58 position using a single image captured by the camera 94 located in proximity to the DLP 50. The neural network 92 is trained to predict the warp map 96 given images captured by the camera 94 in real time for intermediate camera 94 positions (position and angle of the camera 94 in proximity to the DLP 50, and thus, position and angle of the DLP 50). The neural network 92 used this information with interpolation algorithms stored therein to predict the warp map 96.

When applying the warp map 96 to the graphical image 52 projected by the digital light projector 50, the controller 34 is further adapted to encode distortion information from the warp map 96 into the graphical image 52 projected by the digital light projector 50. Thus, the digital light projector 50 is able to project a corrected graphical image 52 that will compensate for distortion of the graphical image 52 as viewed from the perspective of the occupant eye ellipse 58 position, and calibrating the system 11 for proper display of the graphical image 52 for the occupant 80.

In an exemplary embodiment, the controller 34 is further adapted to initiate calibration of the head-up display system 11 within the vehicle 10 upon selective actuation by an occupant 80 within the vehicle 10. Alternatively, the controller 34 is adapted to initiate calibration of the head-up display system 11 automatically, such as each time the vehicle 10 is used, or periodically, such as once every minute or once every hour.

Figure 7:
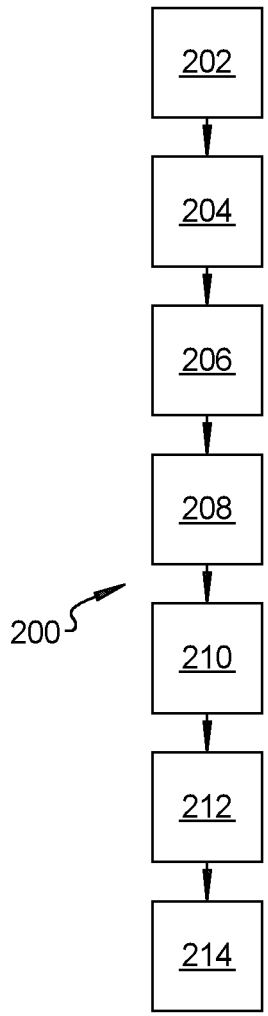
FIG. 7 is a flow chart illustrating a method according to an exemplary embodiment of the present disclosure.
Figure 8:
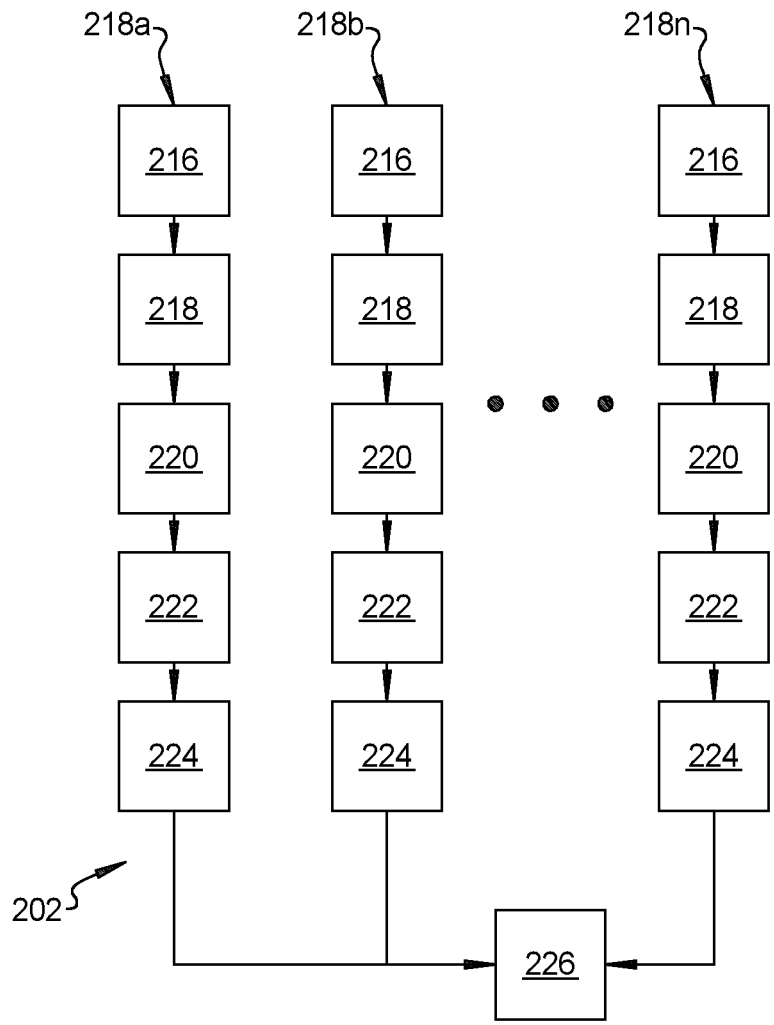
FIG. 8 is a flow chart illustrating method steps of block 202 from FIG. 7.
Figure 9:
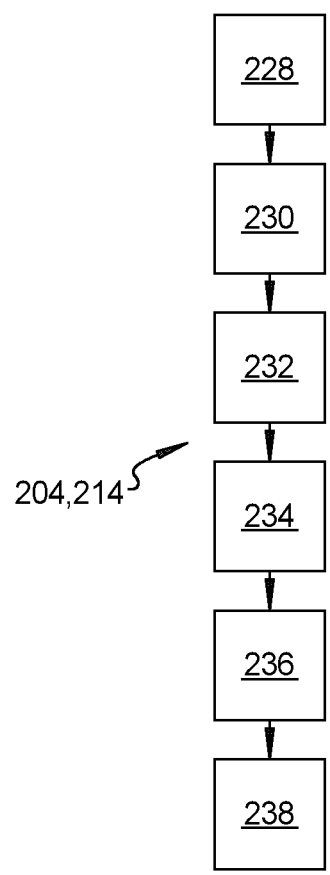
FIG. 9 is a flow chart illustrating method steps of blocs 204 and 214 from FIG. 7.

Referring to FIG. 7, FIG. 8 and FIG. 9, a method 200 of calibrating a head-up display system 11 within a vehicle 10 includes, starting at block 202, training a neural network 92 in communication with a controller 34 to predict warp maps 96 from a single graphical image 52 projected onto an inner surface 54 of a windshield 56 of the vehicle 10. Moving to block 204, the method includes projecting, with a digital light projector 50 positioned within the vehicle 10, a graphical image 52 onto an inner surface 54 of the windshield 56 of the vehicle 10, moving to block 206, capturing, with a camera 94 in proximity to the digital light projector 50, the graphical image 52 projected onto the inner surface 54 of the windshield 56, moving to block 208, locating, with an occupant monitoring system 78 within the vehicle 10, an occupant eye ellipse 58 position, moving to block 210, predicting, with the neural network 92, a warp map 96 for the projected graphical image 52 based on the location of the digital light projector 50, the occupant eye ellipse 58 position and a shape of the windshield 56 within the vehicle 10, moving to block 212, applying, with the controller 34, the warp map 96 to the graphical image 52 projected by the digital light projector 50, and, moving to block 214, projecting, with the digital light projector 50, a corrected graphical image 98 based on the predicted warp map 96.

In an exemplary embodiment, the training a neural network 92 within a controller 34 to predict warp maps 96 from a single graphical image 52 projected onto an inner surface 54 of a windshield 56 of the vehicle 10 at block 202 further includes, moving to block 216, projecting, with a reference digital light projector 102 of a reference system 100, a source image 104 onto an inner surface 106 of a reference windshield 108, moving to block 218, capturing, with a first reference camera 110 located at a reference occupant eye ellipse position 112, the source image 104 from a perspective of the reference occupant eye ellipse position 112, moving to block 220, capturing, with a second reference camera 114 located in proximity to the reference digital light projector 102, the source image 104 from a perspective of the reference digital light projector 102, moving to block 222, calculating, with a reference controller 116, a transformation matrix between the captured source image 128 from the perspective of the reference occupant eye ellipse position 112 and the captured image 120 from the perspective of the reference digital light projector 102, and, moving to block 224, creating a reference warp map 118 for the captured source image 104.

In an exemplary embodiment, the training a neural network 92 within a controller 34 to predict warp maps 96 from a single graphical image 52 projected onto an inner surface 54 of a windshield 56 of the vehicle 10, at block 202, further includes creating a plurality of reference warp maps 118a-118n for a plurality of different source images 104 following the steps set forth in blocks 216-224, wherein each of the plurality of different source images are projected at a plurality of different locations on the inner surface 106 of the reference windshield 108, from a plurality of different reference digital light projector 102 locations within the reference system 100, and for a plurality of different reference windshields 108a-108n, and moving to block 226, storing the plurality of reference warp maps 118a-118n within the neural network 92.

In an exemplary embodiment, the predicting, with the neural network 92, a warp map 96 for the projected graphical image 52 based on the occupant eye ellipse 58 position at block 210 further includes applying, with the neural network 92, interpolation algorithms to predict the warp map 96 for the projected graphical image 52 based on the location of the digital light projector 50, the occupant eye ellipse 58 position and a shape of the windshield 56 within the vehicle 10. Further, the applying, with the controller 34, the warp map 96 to the graphical image 52 projected by the digital light projector 50 at block 212 further includes encoding, with the controller 34, distortion information from the warp map 96 into the graphical image 52 projected by the digital light projector 50.

In another exemplary embodiment, the projecting, with a digital light projector 50, a graphical image 50 onto the inner surface 54 of the windshield 56 of the vehicle 10 at block 204, and the projecting, with the digital light projector 50, a corrected graphical image 98 onto the inner surface 54 of the windshield 56 of the vehicle 10 at block 214 further includes, moving to block 228, projecting, with a light source 62, an excitation light 64, moving to block 230, focusing, with a condensing lens 66, the excitation light 64 from the light source 62, moving to block 232, splitting, with a color filter 68, the focused excitation light 64 into red, green and blue light, moving to block 234, focusing, with a shaping lens 70, the excitation light 64 passing through the color filter 68, moving to block 236, re-directing, with a digital micro-mirror device (DMD) 72, the excitation light 64, and, moving to block 238, receiving, with a projection lens 74, the excitation light 64 from the digital micro-mirror device 72 and projecting, with the projection lens 74, the excitation light 64 to the inner surface 54 of the windshield 56, wherein light emitting particles 90 within the windshield 56 emit visible light in response to absorbing the excitation light 64.

Conventionally, a head-up display is calibrated with respect to a camera positioned at the occupant eye ellipse 58 position, such as described above for the reference system 100, where multiple reference warp maps 118a-118n are generated for various sub-images, projector locations, etc. The head-up display system 11 of the present disclosure allows calibration using a single image captured by the camera 94 positioned at the digital light projector 50, without using a camera located at the occupant eye ellipse 58 position by using machine learning and interpolation algorithms to predict intermediate warp maps 96 based on the stored reference warp maps 118a-118n.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of calibrating a head-up display system within a vehicle, comprising:
    training a neural network in communication with a controller to predict warp maps for an occupant perspective of a single graphical image projected onto an inner surface of a windshield of the vehicle;
    projecting, with a digital light projector positioned within the vehicle, a graphical image onto an inner surface of the windshield of the vehicle;
    capturing, with a camera in proximity to the digital light projector, the graphical image projected onto the inner surface of the windshield;
    locating, with an occupant monitoring system within the vehicle, an occupant eye ellipse position;
    predicting, with the neural network, a warp map for an occupant perspective of the projected graphical image based on the location of the digital light projector, the occupant eye ellipse position and a shape of the windshield within the vehicle;
    applying, with the controller, the warp map to the graphical image projected by the digital light projector; and
    projecting, with the digital light projector, a corrected graphical image based on the predicted warp map.

2. The method of claim 1, wherein the training a neural network within a controller to predict warp maps for an occupant perspective of a single graphical image projected onto an inner surface of a windshield of the vehicle further includes:
    projecting, with a reference digital light projector of a reference system, a source image onto an inner surface of a reference windshield;
    capturing, with a first reference camera located at a reference occupant eye ellipse position, the source image from a perspective of the reference occupant eye ellipse position;
    capturing, with a second reference camera located in proximity to the reference digital light projector, the source image from a perspective of the reference digital light projector;
    calculating, with a reference controller, a transformation matrix between the captured source image from the perspective of the reference occupant eye ellipse position and the captured image from the perspective of the reference digital light projector; and
    creating a reference warp map for the captured source image.

3. The method of claim 2, wherein the training a neural network within a controller to predict warp maps for an occupant perspective of a single graphical image projected onto an inner surface of a windshield of the vehicle further includes:
    creating a plurality of reference warp maps for a plurality of different source images, each of the plurality of different source images being projected at a plurality of different locations on the inner surface of the reference windshield and from a plurality of different reference digital light projector locations within the reference system; and storing the plurality of reference warp maps within the neural network.

4. The method of claim 3, wherein the training a neural network within a controller to predict warp maps for an occupant perspective of a single graphical image projected onto an inner surface of a windshield of the vehicle further includes:
creating the plurality of reference warp maps for a plurality of different reference windshields; and
storing the plurality of reference warp maps within the neural network.

5. The method of claim 4, wherein the predicting, with the neural network, a warp map for an occupant perspective of the projected graphical image based on the occupant eye ellipse position further includes:
applying, with the neural network, interpolation algorithms to predict the warp map for the projected graphical image based on the location of the digital light projector, the occupant eye ellipse position and a shape of the windshield within the vehicle.

6. The method of claim 5, wherein the applying, with the controller, the warp map to the graphical image projected by the digital light projector further includes:
encoding, with the controller, distortion information from the warp map into the graphical image projected by the digital light projector.

7. The method of claim 1, further including initiating calibration of the head-up display within the vehicle upon selective actuation by an occupant within the vehicle.

8. The method of claim 1, further including initiating calibration of the head-up display within the vehicle automatically.

9. The method of claim 1, wherein the projecting, with a digital light projector, a graphical image onto the inner surface of the windshield of the vehicle further includes:
projecting, with a light source, an excitation light;
focusing, with a condensing lens, the excitation light from the light source;
splitting, with a color filter, the focused excitation light into red, green and blue light;
focusing, with a shaping lens, the excitation light passing through the color filter;
re-directing, with a digital micro-mirror device (DMD), the excitation light; and
receiving, with a projection lens, the excitation light from the digital micro-mirror device and projecting, with the projection lens, the excitation light to the inner surface of the windshield.

10. The method of claim 1, wherein the projecting, with the digital light projector positioned within the vehicle, the graphical image onto the inner surface of the windshield of the vehicle further includes:
projecting, with the digital light projector, an excitation light, wherein light emitting particles within the windshield emit visible light in response to absorbing the excitation light.

11. A head-up display system within a vehicle, comprising:
a controller adapted to calibrate the head-up display;
a neural network, in communication with the controller, adapted to predict warp maps for an occupant perspective of a single graphical image projected onto an inner surface of a windshield of the vehicle;
a digital light projector positioned within the vehicle and adapted to project a graphical image onto an inner surface of the windshield of the vehicle;
a camera in proximity to the digital light projector and adapted to capture the graphical image projected onto the inner surface of the windshield;
an occupant monitoring system within the vehicle adapted to locate an occupant eye ellipse position;
the neural network further adapted to predict a warp map for an occupant perspective of the projected graphical image based on the location of the digital light projector, the occupant eye ellipse position and a shape of the windshield within the vehicle;
the controller further adapted to apply the warp map to the graphical image projected by the digital light projector; and
the digital light projector further adapted to project a corrected graphical image based on the predicted warp map.

12. The system of claim 11, further including a reference system, including:
a reference digital light projector adapted to project a source image onto an inner surface of a reference windshield;
a first reference camera located at a reference occupant eye ellipse position and adapted to capture the source image from a perspective of the reference occupant eye ellipse position;
a second reference camera located in proximity to the reference digital light projector and adapted to capture the source image from a perspective of the reference digital light projector; and
a reference controller adapted to calculate a transformation matrix between the captured source image from the perspective of the reference occupant eye ellipse position and the captured image from the perspective of the reference digital light projector and create a reference warp map for the captured source image.

13. The system of claim 12, wherein the reference controller is further adapted to create a plurality of reference warp maps for a plurality of different source images, each of the plurality of different source images being projected at a plurality of different locations on the inner surface of the reference windshield and from a plurality of different reference digital light projector locations within the reference system and store the plurality of reference warp maps within the neural network.

14. The system of claim 13, wherein the reference controller is further adapted to create the plurality of reference warp maps for a plurality of different reference windshields and store the plurality of reference warp maps within the neural network.

15. The system of claim 14, wherein when predicting a warp map for an occupant perspective of the projected graphical image based on the occupant eye ellipse position, the neural network is further adapted to apply interpolation algorithms to predict the warp map for an occupant perspective of the projected graphical image based on the location of the digital light projector, the occupant eye ellipse position and a shape of the windshield within the vehicle.

16. The system of claim 15, wherein when applying the warp map to the graphical image projected by the digital light projector, the controller is further adapted to encode distortion information from the warp map into the graphical image projected by the digital light projector.

17. The system of claim 11, wherein the controller is further adapted to initiate calibration of the head-up display within the vehicle one of:
upon selective actuation by an occupant within the vehicle; and automatically.

18. The system of claim 11, wherein the digital light projector includes:
   a light source adapted to project an excitation light;
   a condensing lens adapted to focus the excitation light from the light source;
   a color filter adapted to split the focused excitation light into red, green and blue light;
   a shaping lens adapted to focus the excitation light passing through the color filter;
   a digital micro-mirror device (DMD) adapted to re-direct the excitation light; and
   a projection lens adapted to receive the excitation light from the digital micro-mirror device and project the excitation light to the inner surface of the windshield.

19. The system of claim 11, wherein the digital light projector is adapted to project an excitation light, wherein light emitting particles within the windshield emit visible light in response to absorbing the excitation light.

20. A vehicle having a head-up display system, the head-up display system including:
   a controller adapted to calibrate the head-up display;
   a neural network, in communication with the controller, adapted to predict warp maps for an occupant perspective of a single graphical image projected onto an inner surface of a windshield of the vehicle;
   a reference system, including:
      a reference digital light projector adapted to project a source image onto an inner surface of a reference windshield;
      a first reference camera located at a reference occupant eye ellipse position and adapted to capture the source image from a perspective of the reference occupant eye ellipse position;
      a second reference camera located in proximity to the reference digital light projector and adapted to capture the source image from a perspective of the reference digital light projector; and
      a reference controller adapted to calculate a transformation matrix between the captured source image from the perspective of the reference occupant eye ellipse position and the captured image from the perspective of the reference digital light projector and create a reference warp map for the captured source image;
      the reference controller further adapted to create a plurality of reference warp maps for a plurality of different source images, each of the plurality of different source images being projected from a plurality of different reference digital light projector locations within the reference system at a plurality of different locations on the inner surface of a plurality of different windshields;
   a digital light projector positioned within the vehicle and adapted to project a graphical image onto an inner surface of the windshield of the vehicle, the digital light projector including:
      a light source adapted to project an excitation light;
      a condensing lens adapted to focus the excitation light from the light source;
      a color filter adapted to split the focused excitation light into red, green and blue light;
      a shaping lens adapted to focus the excitation light passing through the color filter;
      a digital micro-mirror device (DMD) adapted to re-direct the excitation light; and
      a projection lens adapted to receive the excitation light from the digital micro-mirror device and project the excitation light to the inner surface of the windshield, wherein light emitting particles within the windshield emit visible light in response to absorbing the excitation light;
   a camera in proximity to the digital light projector and adapted to capture the graphical image projected onto the inner surface of the windshield;
   an occupant monitoring system within the vehicle adapted to locate an occupant eye ellipse position;
   the neural network further adapted to predict a warp map for an occupant perspective of the projected graphical image by applying interpolation algorithms to predict the warp map for the projected graphical image based on the location of the digital light projector, the occupant eye ellipse position and a shape of the windshield within the vehicle;
   the controller further adapted to apply the warp map to the graphical image projected by the digital light projector by encoding distortion information from the warp map into the graphical image projected by the digital light projector; and
   the digital light projector further adapted to project a corrected graphical image based on the predicted warp map.

* * * * *